Patented June 4, 1946

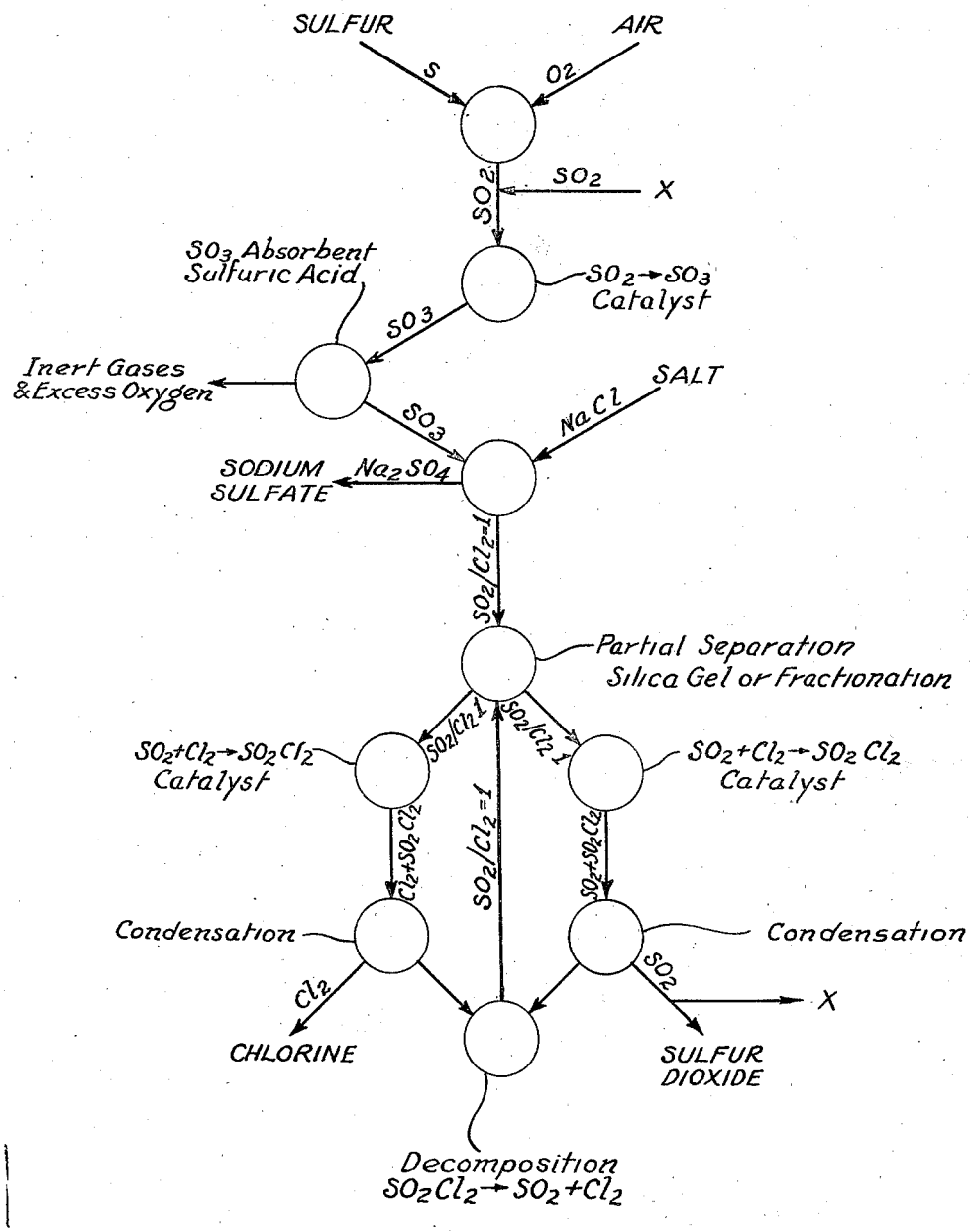

2,401,644

UNITED STATES PATENT OFFICE 2,401,644

METHOD FOR PRODUCING CHLORINE

Ralph K. Iler, East Cleveland, Ohio, assignor to E. I. du Pont de Nemours & Company, Wilmington, Del., a corporation of Delaware Application December 23, 1939, Serial No. 310,835

11 Claims. (Cl. 23—219)

This invention relates to the manufacture of chlorine by the action of sulfur trioxide on sodium chloride and is particularly directed to the recovery of chlorine from mixtures of sulfur dioxide and chlorine. More particularly this invention is directed to processes in which sulfur trioxide is caused to react with sodium chloride to form sodium sulfate and an equimolar mixture of sulfur dioxide and chlorine, a partial separation of sulfur dioxide is effected, and the balance of the sulfur dioxide is eliminated by catalytically combining it with chlorine to form sulfuryl chloride.

The possibility of obtaining chlorine and sodium sulfate from sulfur, oxygen and sodium chloride has long been recognized in the art, and numerous proposals have been made of processes which are said to be suitable for obtaining this result; still these processes for one reason or another have not been adopted in the art. Some are based upon the impractical proposition that sulfur dioxide and oxygen act directly on sodium chloride to form chlorine and sodium sulfate. Others do not take into account the highly corrosive nature of chlorine gases at the temperature required for effecting the reaction. None have provided a practical way of recovering chlorine from the products of the reaction.

I have now discovered that chlorine can be recovered from the products of the reaction of sulfur trioxide and sodium chloride by treating the gaseous products of the reaction to effect partial separation of sulfur dioxide so that the resulting mixture contains chlorine in molecular excess of sulfur dioxide, combining the remaining sulfur dioxide with chlorine as sulfuryl chloride, and separating the sulfuryl chloride. In this manner I am able effectively to separate chlorine from sulfur dioxide, a separation which heretofore has been achieved only with difficulty.

Sulfur trioxide reacts with sodium chloride to form a number of different products, depending upon the temperature of the reaction. At low temperatures sulfur trioxide combines with sodium chloride to form sodium chlorosulfonate. At higher temperatures sodium pyrosulfate is formed and sulfur dioxide and chlorine is liberated. At still higher temperatures the products are sodium sulfate, sulfur dioxide, and chlorine. This invention is particularly concerned with the latter type of reaction, which is effected at a temperature above about 450° C. but in its broader aspects may be applied to the separation of mixtures of sulfur dioxide and chlorine however obtained.

When sulfur trioxide is acted on sodium chloride to form sodium sulfate and a gaseous mixture of sulfur dioxide and chlorine, the sulfur dioxide and chlorine are liberated in equimolecular proportions as represented in the following equation:

The reaction may be effected in two steps, thus,

with the advantage that sodium chlorosulfonate can be formed at low temperatures and decomposed by heating as desired.

The equimolar mixture of sulfur dioxide and chlorine evolved is a highly reactive mixture, and in some respects it is more highly reactive because of the equimolar nature of the mixture. In the presence of water sulfuric acid and hydrochloric acid are formed. In the presence of activated carbon, ethers, ketones, terpines, esters, glycerol, camphor, and numerous other materials, interaction between sulfur dioxide and chlorine takes place. In the presence of metals, chlorides are formed, especially at high temperatures. Similarly, in the presence of metallic oxides, oxychlorides or chlorides are frequently formed, especially at high temperatures.

Because of the highly reactive nature of mixtures of sulfur dioxide and chlorine, especially of the equimolar mixtures, difficulty has been encountered heretofore in effectively separating the two gases, and with the processes heretofore available the complexity and cost of operation increases at a prohibitive rate if the separation is carried out to or near to completion; yet many processes are available in which it is relatively simple to obtain partial separation.

I have now found that if partial separation is effected in any suitable manner the resulting gas, which contains sulfur dioxide and chlorine in other than equimolecular proportions, can very easily and economically be freed of the minor constituent by exposing the mixture to catalysis and separating sulfuryl chloride so formed. Sulfuryl chloride has a relatively high boiling point and consequently may easily be separated from admixture with chlorine by condensation of the sulfuryl chloride from the gas phase or by fractional distillation in accordance with principles and practices well known to those skilled in the art. The sulfuryl chloride recovered may be decomposed by heat into an equimolecular mixture of chlorine and sulfur dioxide and recycled to the partial separation step. It will be sufficient in many cases to inject the sulfuryl chloride into the primary reaction zone where the temperature of 450° C. or more is ample to cause decomposition of the sulfuryl chloride.

In carrying out my invention, as shown in the accompanying flow sheet, sulfur dioxide from any suitable source, as for example a sulfur burner, is combined with oxygen to form sulfur trioxide by the conventional contact process. The sulfur trioxide is then separated from the oxygen, nitrogen, and other gases introduced in the contact plant in order to obtain substantially 100 per cent sulfur trioxide. This may be accomplished by absorption of the sulfur trioxide in sulfur trioxide monohydrate to form oleum or fuming sulfuric acid, followed by regeneration of the sulfur dioxide in a suitable oleum still. Alternatively the sulfur trioxide may be recovered in substantially pure form by precipitating it from the gas as a liquid or solid.

The substantially pure sulfur trioxide so recovered is then caused to react with common salt (sodium chloride) by exposing the salt, preferably finely divided, at a temperature above about 450° C. and preferably below about 600° C. Lower temperatures may be used, but the yield of chlorine per unit of sulfur trioxide is less due to the formation of sodium pyrosulfate. Higher temperatures are undesirable due to the tendency to liquefaction by the formation of sodium sulfate-sodium chloride eutectic.

The reaction may be carried out in two steps— first by reacting sulfur trioxide and salt at a temperature not substantially above 150° C. and preferably below about 100° C. in order to form sodium chloro-sulfonate, and, second, subjecting the sodium chloro-sulfonate to a temperature above about 450° C. in order to form sodium sulfate and a gaseous mixture of chlorine and sulfur dioxide. An advantage is obtained in that separation of impurities from sulfur trioxide may be effected as an incident to the absorption of the sulfur trioxide in the formation of sodium chlorosulfonate.

The gaseous products of the reactions are essentially an equimolar mixture of sulfur dioxide and chlorine. Impurities may be introduced by the salt and some unreacted sulfur trioxide may be present. However, if suitably pure and dry salt is selected and the reaction is properly carried out, the foreign gases present in the sulfur dioxide-chlorine mixture will be negligible. Inert gases, however, will not deleteriously affect the processes of this invention, but require that the chlorine recovered be further processed to eliminate such gases.

The equimolecular mixture of sulfur dioxide and chlorine is then subjected to a partial separation. This may be effected in any suitable manner, as by condensation and fractionation or by passing the mixture through one or more chambers packed with an inorganic capillary adsorbent such as silica gel. Such adsorption may be effected under atmospheric pressure and at ordinary room temperature, but the capacity of the adsorbent may advantageously be increased by the use of higher pressures and, more especially, low temperatures. A substantial proportion of the sulfur dioxide thus may be adsorbed and retained by the adsorbent, which must be inert or non-catalytic to the mixture and the gas passing through the adsorption will consist predominantly of chlorine. Silica gel and other inorganic capillary adsorbents free of uncombined water are suitable. The remaining sulfur dioxide is readily removed by passing the gas in contact with activated carbon under conditions such that the chlorine and sulfur dioxide are catalyzed to sulfuryl chloride. Numerous other materials known to catalyze sulfur dioxide and chlorine may be substituted for activated carbon. Many of these are described and set forth in Meller's Comprehensive Treatise on Inorganic and Theoretical Chemistry, vol. 10, pp. 666 to 670 (1930), Longmans, Green & Company, London. If the heat of the reaction is properly dissipated and the temperature properly controlled, preferably less than 30° C., the sulfuryl chloride is retained by the activated carbon as a liquid which may be continuously drawn off. Any sulfuryl chloride vapors which are not thus condensed may be removed by condensation, by adsorption or by scrubbing with aqueous media. The latter, however, should be applied only when small amounts of sulfuryl chloride are present.

The sulfuryl chloride is then decomposed by heating, suitably by passing it either in direct or in indirect heat exchange with the sulfur trioxide-sodium chloride reaction and the equimolar mixture of sulfur oxide and chlorine is passed through the system for further separation. The major portion of chlorine in the gas mixture is thus recovered.

As an incident to partial separation, for example, upon desorption of the adsorbent, a gas mixture rich in sulfur dioxide is obtained. Chlorine may be recovered from such mixtures as sulfuryl chloride in the manner described above and the sulfur dioxide may be returned to the contact plant for the production of more sulfur trioxide. An advantage is found in this operation because the sulfur dioxide recovered is highly concentrated and may be used to increase the sulfur dioxide content of the gas undergoing conversion in the contact plant.

It will, of course, be understood by those skilled in the art that the principles of my invention are applicable to the separation of mixtures of gases containing chlorine and sulfur dioxide in other than equimolecular proportions however obtained, and to partial separation of equimolecular mixtures of chlorine and sulfur dioxide by a wide variety of processes. It will also be evident that mixtures of chlorine and sulfur dioxide may be obtained in other manners than by the action of sulfur trioxide on sodium chloride.

I claim:

1. In the manufacture of chlorine and sodium sulfate from sodium chloride and sulfur trioxide the steps comprising causing sulfur trioxide to act on sodium chloride in a manner to yield gaseous products containing sulfur dioxide and chlorine in equimolecular proportion, separating the gaseous products thus obtained from the solids and treating the gas mixture thus obtained to effect partial separation of sulfur dioxide thereby to obtain a gas mixture rich in chlorine, treating the chlorine-rich gas mixture thus obtained catalytically to combine the sulfur dioxide therein with chlorine to form sulfuryl chloride, separating out the sulfuryl chloride thus formed and recovering the chlorine.

2. In the manufacture of chlorine and sodium sulfate from sodium chloride and sulfur trioxide the steps comprising causing sulfur trioxide to act on sodium chloride in a manner to yield gaseous products containing sulfur dioxide and chlorine in equimolecular proportion, separating the gaseous products thus obtained from the solids and treating the gas mixture thus obtained to effect partial separation of sulfur dioxide thereby to obtain a gas mixture rich in chlorine, treating the chlorine-rich gas mixture thus obtained catalytically to combine the sulfur dioxide therein with chlorine to form sulfuryl chloride, separating out the sulfuryl chloride thus formed and recovering the chlorine, treating the sulfuryl chloride thus formed to decompose it into chlorine and sulfur dioxide and co-mingling the decomposition product thus obtained with the gaseous products of the reaction of sulfur trioxide and sodium chloride.

3. In a process for the recovery of chlorine from gas mixtures containing sulfur dioxide in an amount by volume substantially equal to the chlorine the steps of treating the gas mixture to effect a partial separation of the two gases by passing it in contact with an inorganic capillary adsorbent capable of preferentially adsorbing sulfur dioxide thereby to obtain a gas mixture containing chlorine by volume in excess of the sulfur dioxide, then passing the chlorine-rich gas mixture thus obtained in contact with activated carbon to convert the sulfur dioxide to sulfuryl chloride and separating unreacted chlorine from the sulfuryl chloride whereby chlorine is obtained essentially free of sulfur dioxide.

4. In a process for the recovery of chlorine from gas mixtures containing sulfur dioxide in an amount by volume substantially equal to the chlorine the steps of treating the gas mixture to effect a partial separation of the two gases by passing it in contact with an inorganic capillary adsorbent capable of preferentially adsorbing sulfur trioxide thereby to obtain a gas mixture containing chlorine by volume in excess of the sulfur dioxide, then passing the chlorine-rich gas mixture thus obtained in contact with activated carbon to convert the sulfur dioxide to sulfuryl chloride and separating unreacted chlorine from the sulfuryl chloride whereby chlorine is obtained essentially free of sulfur dioxide, treating the sulfuryl chloride thus obtained to decompose it into chlorine and sulfur dioxide and co-mingling the decomposition products thus obtained with the initial gas mixture.

5. In a process for the recovery of chlorine from gas mixtures containing sulfur dioxide in an amount by volume substantially equal to the chlorine the steps of treating the gas mixture to effect partial separation of sulfur dioxide thereby to obtain a gas mixture rich in chlorine, treating the chlorine-rich gas mixture thus obtained catalytically to combine the sulfur dioxide therein with chlorine as sulfuryl chloride, separating the sulfuryl chloride thus formed and recovering the chlorine.

6. In a process for the recovery of chlorine from gas mixtures containing sulfur dioxide in an amount by volume substantially equal to the chlorine the steps of treating the gas mixture to effect partial separation of sulfur dioxide thereby to obtain a gas mixture rich in chlorine, treating the chlorine-rich gas mixture thus obtained catalytically to combine the sulfur dioxide therein with chlorine as sulfuryl chloride, separating the sulfuryl chloride thus formed and recovering the chlorine, treating the sulfuryl chloride thus obtained to decompose it to sulfur dioxide and chlorine and co-mingling the decomposition products thus obtained with the initial gas mixture.

7. In a process for the recovery of chlorine from gas mixtures containing sulfur dioxide in an amount by volume substantially equal to the chlorine the steps of separating the gas mixture into a chlorine-rich component and a sulfur dioxide-rich component, subjecting each of said components to catalysis under conditions yielding sulfuryl chloride thereby to convert essentially all of the sulfur dioxide in the chlorine-rich component to sulfuryl chloride and substantially all of the chlorine in the sulfur dioxide rich component to sulfuryl chloride, separately treating the product thus obtained to separate sulfuryl chloride therefrom thereby to leave as one product chlorine essentially free of sulfur dioxide and as another product sulfur dioxide essentially free of chlorine.

8. In a process for the recovery of chlorine from gas mixtures containing sulfur dioxide in an amount by volume substantially equal to the chlorine the steps of separating the gas mixture into a chlorine-rich component and a sulfur dioxide-rich component, subjecting each of said components to catalysis under conditions yielding sulfuryl chloride thereby to convert essentially all of the sulfur dioxide in the chlorine-rich component to sulfuryl chloride and substantially all of the chlorine in the sulfur dioxide rich component to sulfuryl chloride, separately treating the product thus obtained to separate sulfuryl chloride therefrom thereby to leave as one product chlorine essentially free of sulfur dioxide and as another product sulfur dioxide essentially free of chlorine, treating the sulfuryl chloride thus obtained to decompose to chlorine and sulfur dioxide and co-mingling the decomposition products thus obtained with the initial gas mixture.

9. In the manufacture of chlorine and sodium sulfate from sulfur dioxide and sodium chloride the steps of causing sulfur trioxide to act on sodium chloride in a manner to yield gaseous products containing sulfur dioxide and chlorine in equimolecular proportion, separating the gaseous products from the solids, separating the gas mixture thus obtained into a chlorine-rich component and a sulfur dioxide-rich component, separately subjecting each of said components to catalysis under conditions yielding sulfuryl chloride, separately treating each of the products thus obtained to separate out the sulfuryl chloride and thereby to obtain as one product chlorine essentially free of sulfur dioxide and as another sulfur dioxide essentially free of chlorine, treating the sulfuryl chloride thus obtained to decompose it to sulfur dioxide and chlorine and co-mingling the decomposition products thus obtained with the gaseous products of the initial reaction.

10. In a process for the manufacture of chlorine and sodium sulfate from sodium chloride and sulfur the steps comprising burning the sulfur in air to provide a burner gas containing sulfur dioxide, oxygen and inert gases, treating the burner gas to oxidize the sulfur dioxide to sulfur trioxide, treating the sulfur trioxide-containing gas thus obtained to free it of oxygen and inert gases, causing the sulfur trioxide thus obtained to act on sodium chloride in a manner to yield a gaseous mixture of sulfur dioxide and chlorine in substantially equimolecular proportion, separating the gas mixture thus obtained from the solids and treating it to effect separation into a chlorine-rich component and a sulfur dioxide-rich component, separately subjecting each of said components to catalysis under conditions yielding sulfuryl chlorine, treating each of the products thus obtained to separate out the sulfuryl chloride thereby to obtain as one product chlorine and as the other product sulfur dioxide, co-mingling the sulfur dioxide thus obtained with the burner gas, treating the sulfuryl chloride thus obtained to decompose it to chlorine and sulfur dioxide and co-mingling the decomposition products thus obtained with the gas mixture of the reaction of the sulfur trioxide and the salt.

11. In a process for the recovery of chlorine from gas mixtures containing sulfur dioxide in an amount by volume substantially equal to the chlorine the steps of effecting a partial separation of the two gases by passing the gas mixture in contact with a non-catalytic adsorbent thereby to obtain a gas mixture containing chlorine by volume in excess of sulfur dioxide then treating the chlorine-rich gas mixture with a catalytic material adapted to promote the combination of chlorine and sulfur dioxide under conditions to convert the sulfur dioxide to sulfuryl chloride, separating out the sulfuryl chloride and recovering the chlorine.

RALPH K. ILER.